United States Patent
McElwee (10) Patent No.: US 6,393,108 B1
(45) Date of Patent: May 21, 2002

(54) VOICE MESSAGING SYSTEM WHICH ALLOWS A REMOTE USER TO RETURN A CALL WITHOUT DISCONNECTING FROM A TELEPHONE LINE

(75) Inventor: John R. McElwee, Allentown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/109,098

(22) Filed: Jul. 2, 1998

(51) Int. Cl.$^7$ ................................................ H04M 3/42
(52) U.S. Cl. ................................. 379/88.19; 379/210.01
(58) Field of Search ....................... 379/67.1, 70, 88.19, 379/88.2, 88.21, 88.22, 88.25, 102.02, 127, 142, 210, 213, 214, 210.01, 213.01, 214.01, 142.01, 127.01

(56) References Cited

U.S. PATENT DOCUMENTS

| | | | | |
|---|---|---|---|---|
| 4,873,719 A | * | 10/1989 | Reese | 379/215 |
| 4,930,152 A | * | 5/1990 | Miller | 379/214 |
| 5,062,133 A | * | 10/1991 | Melrose | 379/94 |
| 5,425,091 A | * | 6/1995 | Josephs | 379/201 |
| 5,572,576 A | * | 11/1996 | Klausner et al. | 379/67 |
| 5,717,741 A | * | 2/1998 | Yue et al. | 379/67 |
| 5,764,731 A | * | 6/1998 | Yablon | 379/88 |
| 5,870,463 A | * | 2/1999 | Shin | 379/212 |
| 5,974,117 A | * | 10/1999 | Mahvi | 379/88.12 |
| 6,067,349 A | * | 5/2000 | Suder et al. | 379/88.19 |
| 6,195,418 B1 | * | 2/2001 | Ridgley | 379/88.23 |
| 6,330,079 B1 | * | 12/2001 | Dugan et al. | 379/102.02 X |

FOREIGN PATENT DOCUMENTS

WO    WO 94/27394    * 11/1994

* cited by examiner

Primary Examiner—Scott L. Weaver
(74) Attorney, Agent, or Firm—William H. Bollman (57) ABSTRACT

Apparatus and processes to provide a telephone answering device for receiving and recording a voice message from a caller to a user over a telephone line. The voice message is retrievable from the telephone answering device by the user from a remote location. After the user retrieves the message, but while the remote user is still on the telephone line, a calling module in the telephone answering device directs, at the remote user's request, a call back to the caller. The remote user is then connected to the call to the third party using the same telephone line without disconnecting the user from the original phone call.

30 Claims, 5 Drawing Sheets

VOICE MESSAGING SYSTEM WHICH ALLOWS A REMOTE USER TO RETURN A CALL WITHOUT DISCONNECTING FROM A TELEPHONE LINE

BACKGROUND OF THE INVENTION

1. Field of the Invention

This invention relates generally to voice messaging systems. More particularly, it relates to a telephone answering device capable of allowing a user to remotely retrieve voice messages and call back a person who left a message without disconnecting from the remote telephone line.

2. Background of Related Art

Voice messaging systems in general, and telephone answering devices (i.e., answering machines) in particular, are useful devices for the home or office. A conventional telephone answering device operates on a single telephone line and answers an incoming call to an unused (i.e., on-hook) telephone after a desired number of rings. The telephone answering device causes the telephone line to enter an off-hook condition, then plays an outgoing greeting message to the caller. After the outgoing message, the caller may leave a voice message on the telephone answering device. At a later time, the voice message is replayed by the user, either local to the telephone answering device or via remote connection from another telephone.

Figure 5:
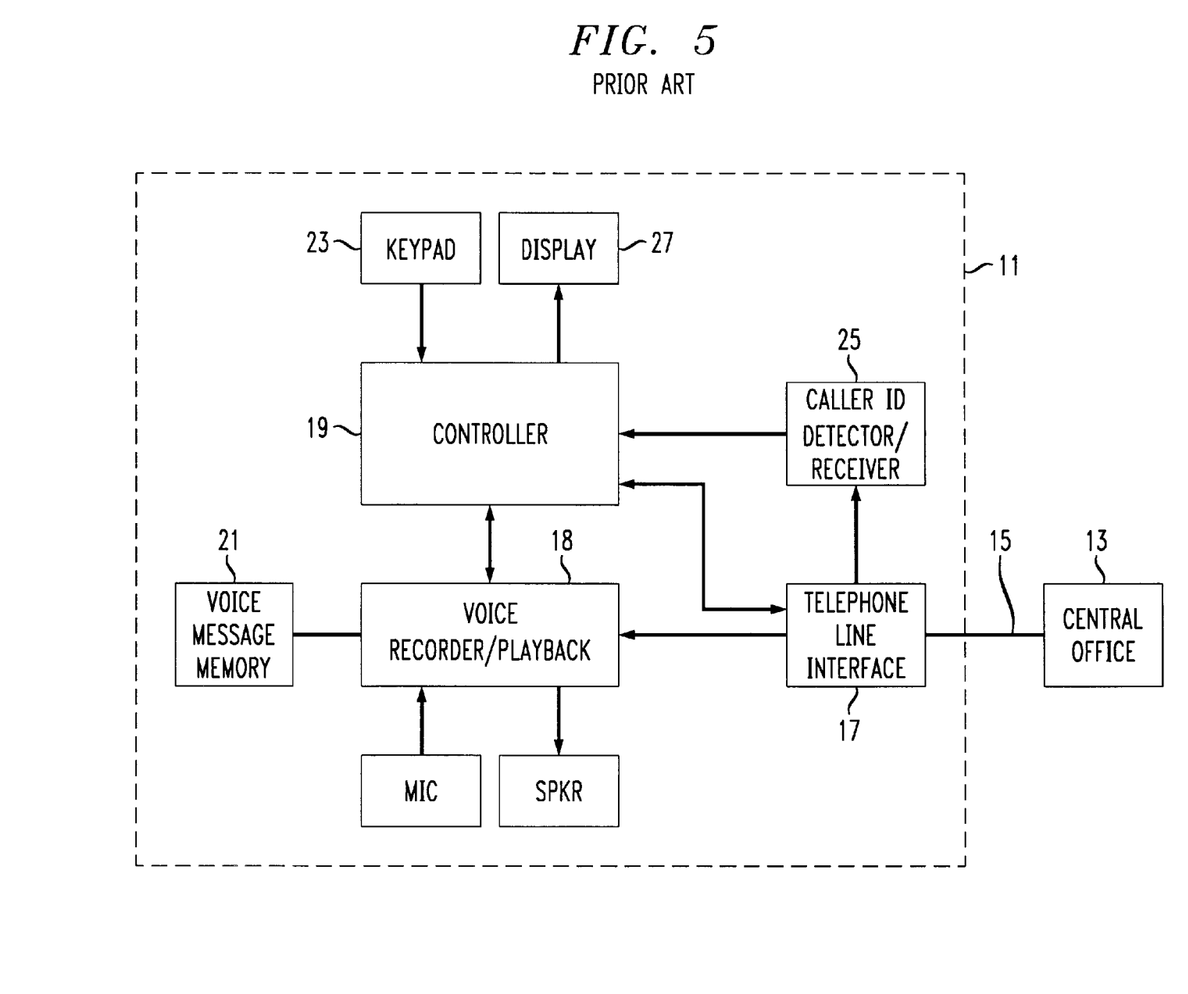
FIG. 5 illustrates a conventional telephone answering device operating on a single telephone line.

FIG. 5 illustrates a conventional telephone answering device capable of answering an incoming call on a telephone line. In FIG. 5, a telephone answering device 11 is connected to a telephone company central office 13 via a telephone line 15. A telephone line interface (TLI) 17 in the telephone answering device 11 provides the conventional isolation, DC and AC impedance as required by telephone company standards. The telephone line interface 17 also provides a ring detect signal to a controller 19. Controller 19 may be any suitable processor, e.g., microprocessor, microcontroller, or digital signal processor (DSP). The ring detect signal indicates to the controller 19 the ringing of an incoming call on the telephone line 15.

After a desired number of ring signals, the telephone answering device 11 causes the telephone line interface 17 to place the telephone line in an off-hook state, and instructs a voice recorder/playback audio module 18 to play an outgoing greeting message over the telephone line 15 to the caller. Upon completion of the outgoing greeting message, the caller may leave a voice message in voice memory 21 under the control of controller 19. A keypad 23 allows the user to select various modes of operation, including the playback of voice messages.

The conventional telephone answering device 11 illustrated in FIG. 5 includes a Calling Identity Delivery (Caller ID) detector/receiver 25 to detect and receive call related information, e.g., the telephone number and/or household name of a calling party. The call related information is displayed on display 27.

By using Caller ID, the user of the conventional telephone answering device 11 can determine the name and telephone number of the caller leaving the voice message. Basic call information such as Caller ID information is transmitted from the local telephone company to the called party while the called party's phone is in a hung-up or on-hook state, e.g., between the first and second rings.

Oftentimes, a remote user of a voice messaging system such as a telephone answering device may want to return a call to a caller who left a voice message. However, there are instances where it may not be convenient or possible for the remote user to call back those who called the voice messaging system. For example, if the user is at a pay phone and has minimal funds for additional phone calls, the user may need to return the telephone calls but may not have sufficient funds or change to complete the task. Additionally, if the telephone answering device's location is a toll call from the user's remote location, the user will be required to make multiple toll calls to return his/her messages thereby spending additional money. Furthermore, persons may leave a message without leaving a telephone number in the voice message. In such a case, the call related information (e.g., Caller ID information) may be the only information useful for calling the caller back, but is displayed at the telephone answering device itself.

Unfortunately, conventional telephone answering devices do not allow a user to retrieve his/her messages from a remote location and then to return a call to one or more callers without having to first disconnect the telephone line, deposit or expend additional funds, and dial the caller's telephone number.

Accordingly, there exists a need for a telephone answering device which allows a user to remotely retrieve voice messages and return one or more calls to callers without having to disconnect from a telephone line.

SUMMARY OF THE INVENTION

In accordance with the principles of the present invention, a controlling system for a voice messaging system comprises a controller. A calling module, controlled by the controller, is adapted to initiate a telephone call back to a caller to the voice messaging system. The controlling system also includes a DTMF generator. The calling module causes the controller to initiate an outgoing call, with a telephone number of the outgoing call relating to a party who called the voice messaging system.

In accordance with another aspect of the present invention, a telephone answering device comprises a controller and a voice recorder/playback module. A calling module is also included which is activated by a remote user to call back a caller. The calling module causes the controller to initiate a telephone call between the remote user and the caller.

A method for remotely calling back callers to a voice messaging system in accordance with the principles of the present invention comprises allowing a user remote access via a telephone line to stored voice messages in a voice messaging system. The remote user is placed on hold. A call on the telephone line from the voice messaging system is initiated to a previous caller to the voice messaging system, while the remote user remains on hold. A communication path between the remote user and the caller is established.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a voice messaging system, and method for recording a voice message of a caller, which allows a user to remotely retrieve a voice message and return a call to the caller who left the voice message, without having to disconnect from the telephone line.

In particular, call related information with respect to a caller is detected and received in a call information detector/receiver. After a predetermined number of rings, a telephone answering device in accordance with the principles of the present invention automatically answers the call by placing the telephone line in an off-hook condition and initiating a standard outgoing greeting message. Thereafter, the caller can leave a voice message on the telephone answering device, which is stored in voice message memory via a voice recorder/playback module. Upon retrieval of the voice message by the user from a remote location, the telephone answering device can be prompted to connect the remote user with the third party caller without disconnecting the remote user from the telephone line. By not disconnecting the user, a voice messaging system in accordance with the principles of the present invention increases the user's convenience, increases productivity by not requiring the remote user to hang up and separately call back each caller to his/her voice messaging system, and decreases costs by calling the third party caller from a home or office location.

Figure 1:
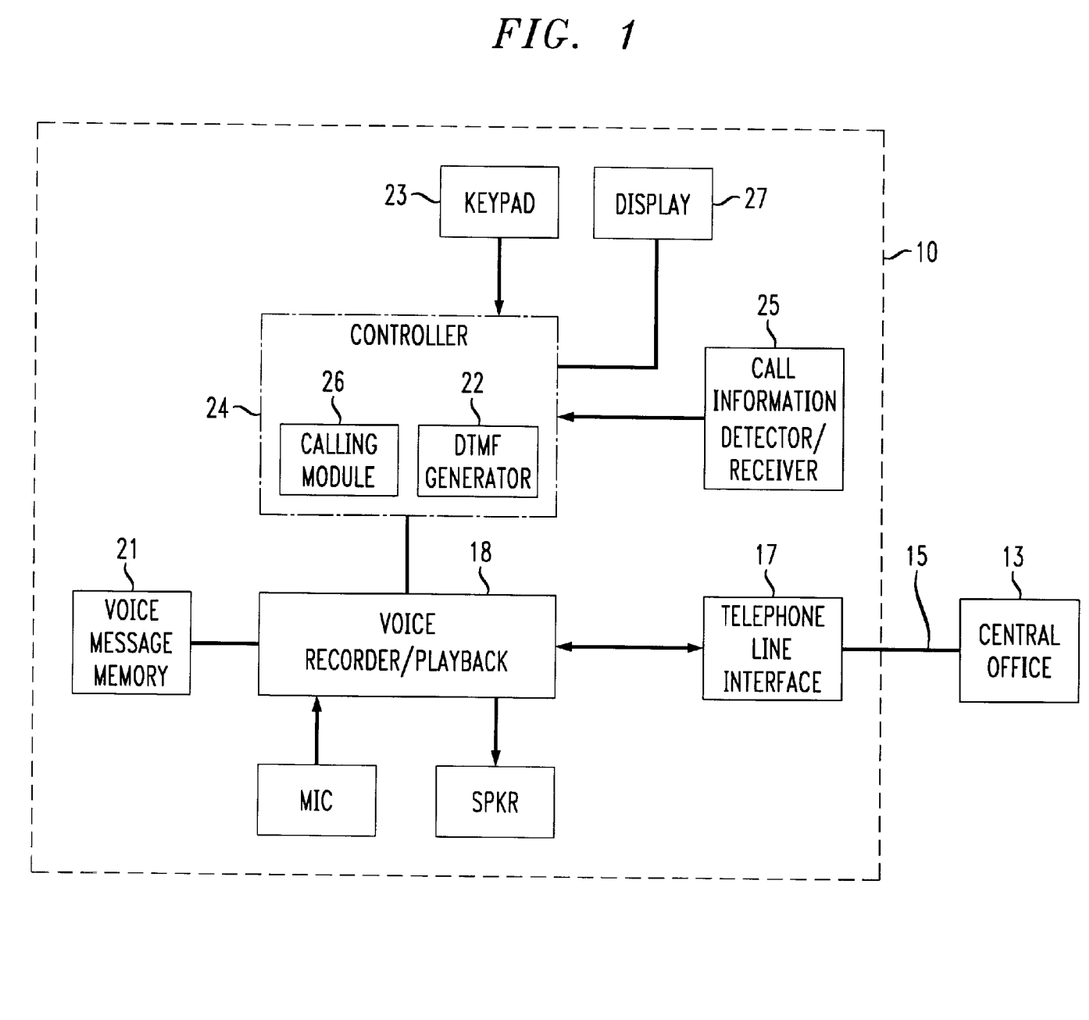
FIG. 1 illustrates a telephone answering device for allowing a user to remotely retrieve voice messages and return one or more calls to callers, without having to disconnect from a telephone line, in accordance with the principles of the present invention.

In particular, FIG. 1 illustrates a telephone answering device, indicated generally at 10, capable of recording a voice message of a caller, allowing a user to remotely retrieve the voice message, and allowing the user to return a call to the caller leaving the voice message, without having to disconnect from the initial telephone call, in accordance with the principles of the present invention.

In the embodiment of FIG. 1, the telephone answering device 10 includes at least one telephone line interface 17 for interconnection with a central office 13 via a telephone line 15. The telephone line interface 17 interconnects the telephone line 15 with a voice recorder/playback module 18. Furthermore, the telephone line interface 17 preferably interconnects the telephone line 15 with a call information detector/receiver 25 (e.g., for detecting and receiving the available Caller ID information). The call information detector/receiver 25 detects and receives available call related information regarding a caller to the user of the telephone line 15.

The telephone answering device 10 of the present invention further includes a dual tone, multiple frequency (DTMF) generator 22 implemented within a controller 24. The controller 24 may be any suitable processor, e.g., microprocessor, microcontroller, or digital signal processor (DSP). The DTMF generator 22 provides touch tone signals for use by the telephone answering device 10 to dial out on the telephone line 15 when prompted by the remote user of the telephone answering device 10, e.g., after the retrieval of the voice messages.

The telephone answering device 10 of FIG. 1 further includes a calling module 26 which can return a call to a past caller without requiring a remote user to disconnect from the telephone line 15.

To allow the telephone answering device 10 access to an additional telephone line, the central office 13 may include conventional three way conference calling services.

The calling module 26 of the telephone answering device 10 flashes the telephone line 15 to put the remote user on hold, and allows a dial tone from the central office 13 to be presented to the telephone answering device 10. The telephone answering device 10 then dials out, using call related information if available, e.g., Caller ID information. Alternatively, if a telephone number of the caller is not available using call related information, the controller 24 may provide pre-stored voice prompt information requesting a telephone number be input by the remote user. For instance, the voice recorder/playback module 18 may audibly request that a telephone number be input using a DTMF keypad. In such a case, the controller 24 would include a DTMF decoder to decode the digits of the telephone number as they are input by the remote user.

The telephone answering device 10 then establishes a telephone call between the telephone answering device 10 and the third party, and again flashes the telephone line 15 to indicate to the central office 15 to conference together the incoming telephone call from the remote user with the outgoing telephone call to the third party, and to present the same to the remote user as a single telephone call. Thus, a three way call is established between the remote user, the telephone answering device 10, and the third party.

The calling module 26 is preferably a software module included within the program code of the controller 24. Of course, the calling module 26 can be implemented separate from the controller 24, but regardless, will preferably be in communication with the controller 24.

Figure 2:
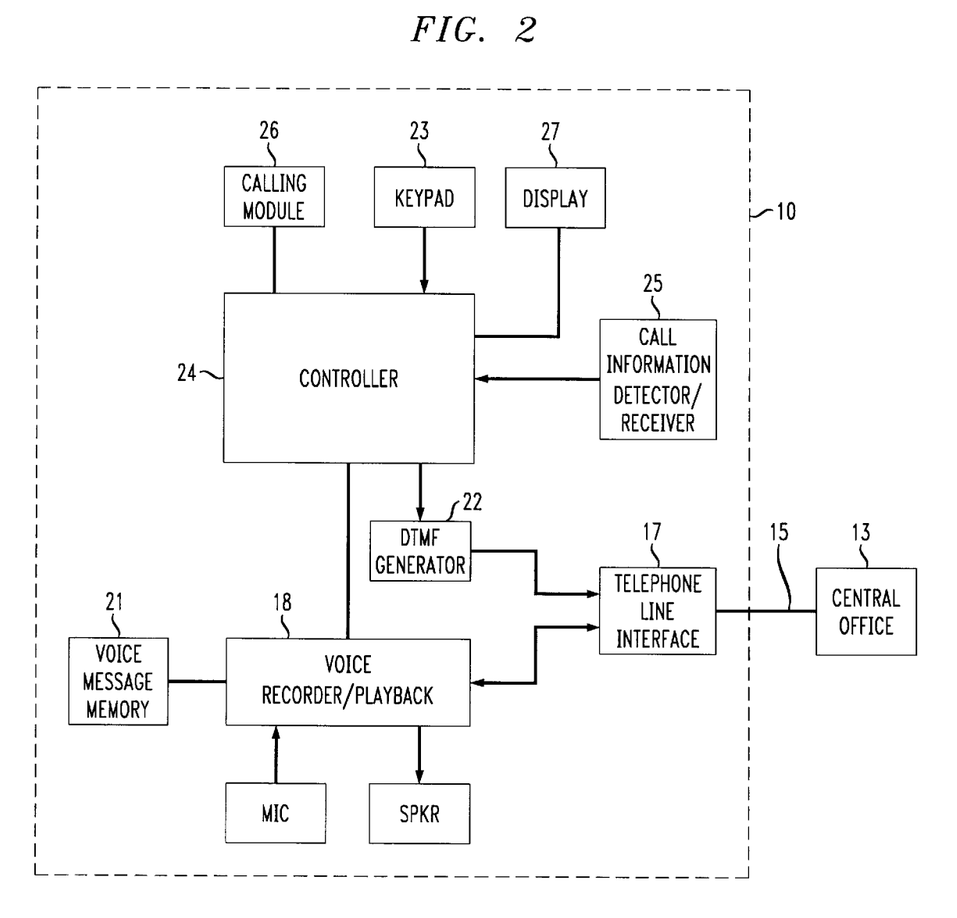
FIG. 2 illustrates another embodiment of a telephone answering device for allowing a user to remotely retrieve voice messages and return one or more calls to callers without having to disconnect from a telephone line, in accordance with the principles of the present invention.

FIG. 2 shows an alternative embodiment of the telephone answering device 10. In particular, FIG. 2 shows a DTMF generator 22 which is separate from the controller 24. Preferably, the DTMF generator 22 is controlled by the controller 24.

Figure 3:
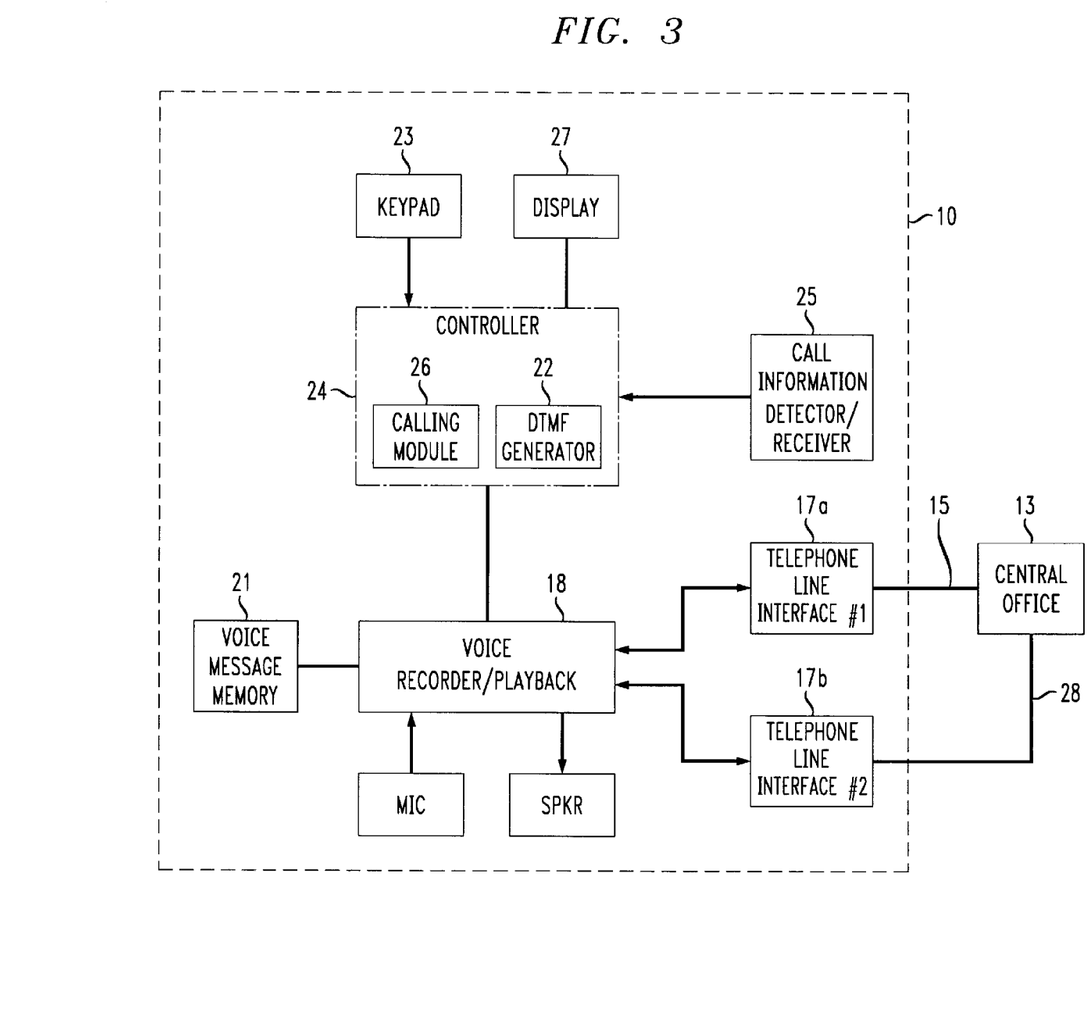
FIG. 3 illustrates yet another embodiment of a telephone answering device for allowing a user to remotely retrieve voice messages and return one or more calls to callers without having to disconnect from a telephone line, in accordance with the principles of the present invention.

FIG. 3 shows yet another embodiment of a telephone answering device 10 in accordance with the principles of the present invention.

In particular, FIG. 3 shows that rather than having the three way conference calling services utilizing one telephone line 15 as in FIGS. 1 and 2, the remote user can instead utilize at least two telephone lines 15, 28 and a telephone answering device 10 having two telephone line interfaces 17a, 17b for receiving the multiple telephone lines 15, 28. In this instance, the telephone answering device 10 still records the incoming voice message of a caller in the manner described above. However, instead of establishing a three-way call on a single telephone line 15, as in the embodiments of FIGS. 1 and 2, the user remotely retrieves his/her voice messages from the telephone answering device 10 on one telephone line, e.g., on the first telephone line 15. The telephone answering device 10, upon directive from a remote user, then establishes a call on the second telephone line 28 back to the caller who left a particular voice message.

The remote user may designate the particular voice message to return a call to by, e.g., inputting a particular predetermined code when prompted by the telephone answering device 10.

Upon establishment of the call from the telephone answering device 10 to the third party on the second telephone line 28, the telephone answering device 10 establishes a voice communication path between the first telephone line 15 and the second telephone line 28. In this way, the remote user can return a message or speak directly with the caller leaving the voice message without having to be disconnected from the first telephone line 15.

The number of telephone lines actually accessible through the telephone answering device 10 for conference calling by the user is limited only by the number of connections available to the telephone answering device 10.

Figure 4:
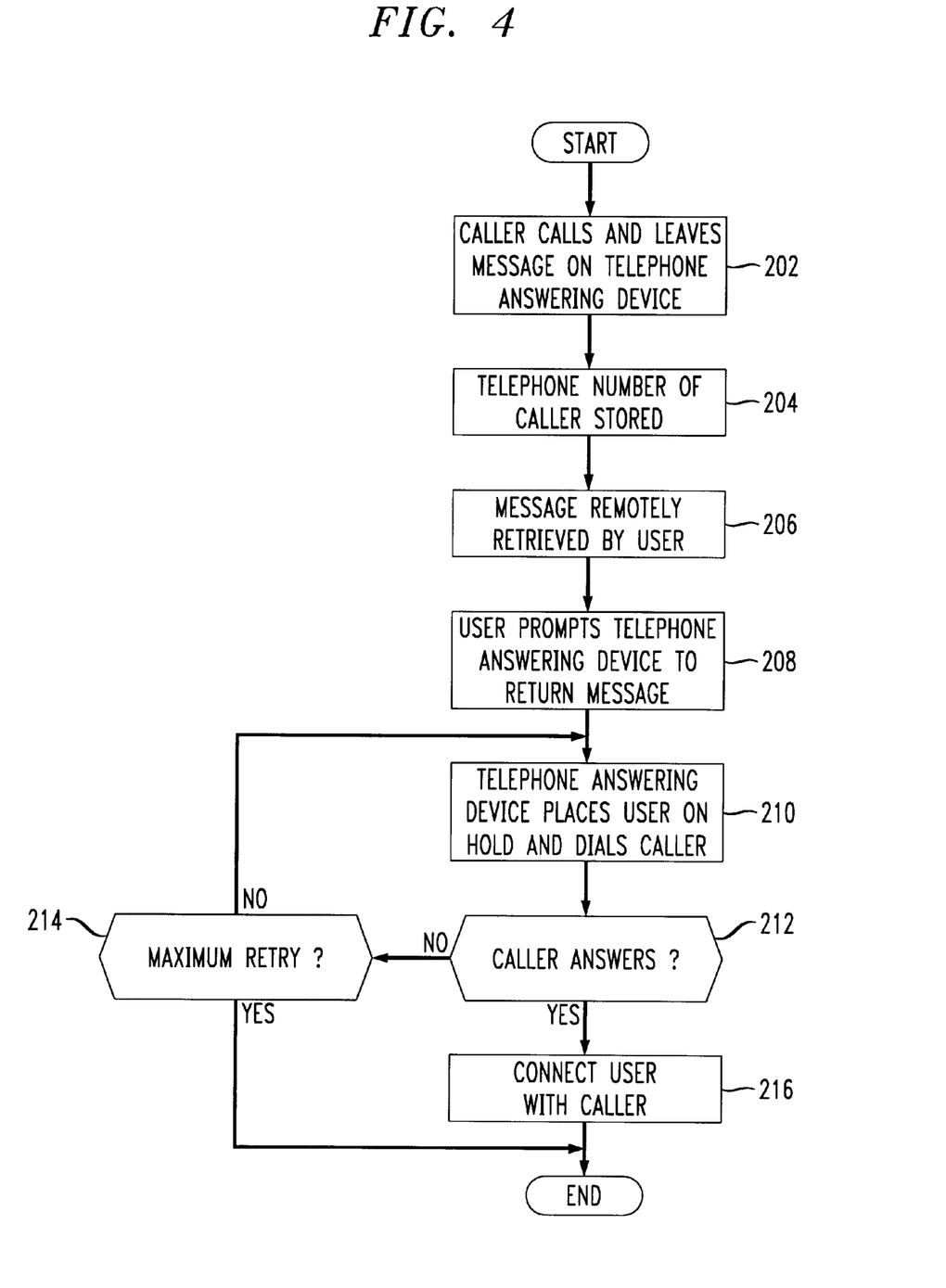
FIG. 4 is a flow chart illustrating the process by which the telephone answering device of FIGS. 1–3 constructed in accordance with the present invention records a caller's voice message, allows a user to remotely retrieve the voice message, and return a call to any caller without having to disconnect from the telephone line.

FIG. 4 illustrates a flow chart showing the process by which the telephone answering devices 10 of FIGS. 1 and 2 allow a remote user to return a call to a person leaving a voice message wherein the telephone answering device 10 maintains connection to the telephone line 15 after retrieval of the voice message by the remote user.

With reference to FIG. 4, in step 202, the caller attempts to call the user at the telephone number of the telephone line 15. Upon a predetermined number of rings, the telephone answering device 10 answers and plays an outgoing greeting message such as "I'm not available right now, please leave a message" or other similar greeting. The telephone answering device 10 further generally allows the caller to record an incoming voice message of a predetermined or indeterminate length. The telephone answering device 10 stores the voice message in voice message memory 21 until the user, either local or remote, retrieves and deletes the voice message from the telephone answering device 10. The call related information, e.g., the telephone number with respect to the voice message, is indicated to the user via a display 27 and stored in memory accessible by the controller 24, as indicated in step 204.

In step 206, the user remotely retrieves, e.g., from a location remote from the telephone answering device 10, the voice message left by the caller on the telephone answering device 10. In step 208, upon retrieving the incoming message from the telephone answering device 10, the remote user of the telephone answering device can prompt the telephone answering device 10 to flash the telephone line 15, thus placing the remote user on hold.

In step 210, the DTMF generator 22 provides touch tone signals for use by the telephone answering device 10 to dial out on the telephone line 15, to return a call to the person leaving the voice message.

In decision step 212, the telephone answering device 10 determines if the third party caller has answered the call from the telephone answering device 10 dialed on the telephone line 15. If not, step 210 is repeated until the caller answers.

A time-out or maximum retry limit may be tested in step 214 to exit the calling module 26, e.g., after a predetermined number of unsuccessful callback tries. The user may set the predetermined number of unsuccessful callback tries before timeout, or may rely on a factory default setting, e.g., of two.

At an appropriate time, e.g., when the called-back caller answers his/her telephone, in step 216, the telephone answering device 10 again flashes the telephone line 15 and causes the central office 13 to connect the remote user to the third party caller. Alternatively, the telephone answering device 10 may again flash the telephone line 15 before the called-back caller answers his/her telephone.

While the embodiments disclosed herein relate to a telephone answering device in particular, the principles of the present invention are equally applicable to voice messaging systems in general.

While the invention has been described with reference to the exemplary embodiments thereof, those skilled in the art will be able to make various modifications to the described embodiments of the invention without departing from the true spirit and scope of the invention.

What is claimed is:

1. A controlling system for a voice messaging system, comprising:

a controller;

a calling module, controlled by said controller, and adapted to initiate an outgoing telephone call;

a DTMF generator; and a device to receive call related information through a central office;

wherein said calling module causes said controller to signal a central office to place a remote user on a single telephone line on hold, allowing said voice messaging system to initiate an outgoing telephone call based on call related information received by said device through said central office, using said single telephone line.

2. The controlling system for a voice messaging system according to claim 1, wherein:

said telephone call is initiated back to a past caller to said voice messaging system.

3. The controlling system for a voice messaging system according to claim 1, wherein:

said telephone call is initiated to a third party other than said remote user to said voice messaging system.

4. The controlling system for a voice messaging system according to claim 1, wherein:

said outgoing call relates to a party who called said voice messaging system.

5. The controlling system for a voice messaging system according to claim 1, wherein:

said caller is a caller who left a voice message in memory of said voice messaging system.

6. The controlling system for a voice messaging system according to claim 2, further comprising:

a voice message memory to store a voice message from said past caller.

7. The controlling system for a voice messaging system according to claim 1, further comprising:

a voice recorder and playback module; and a single telephone line interface to interface said voice recorder and playback module to said single telephone line.

8. The controlling system for a voice messaging system according to claim 1, wherein:

a telephone number of said outgoing call is obtained from a past caller to said voice messaging system.

9. The controlling system for a voice messaging system according to claim 1, wherein:

said voice messaging system is a single telephone line telephone answering device.

10. The controlling system for a voice messaging system according to claim 1, further comprising:

a first telephone line interface to interface said controller to a first telephone line; and a second telephone line interface to interface said controller to a second telephone line.

11. A controlling system for a voice messaging system, comprising:

a controller;

a calling module, controlled by said controller, and adapted to initiate a telephone call;

a DTMF generator; and a call related information detector and receiver to detect and receive a telephone number of incoming calls;

wherein said calling module causes said controller to signal a central office to place a remote user on a single telephone line on hold, allowing said voice messaging system to initiate an outgoing call, using said single telephone line.

12. The controlling system for a voice messaging system according to claim 11, wherein said call related information detector and receiver comprises:

a Caller ID detector and receiver.

13. A method for remotely calling back callers to a voice messaging system, comprising:

allowing a remote user remote access via a single telephone line to stored voice messages in a voice messaging system;

placing said remote user on hold;

obtaining from a central office call related information regarding said call;

initiating, while said remote user remains on hold, a call on said single telephone line from said voice messaging system; and establishing a communication path between said remote user and said call.

14. The method for remotely calling back callers to a voice messaging system according to claim 13, wherein:

said communication path includes a central office.

15. The method for remotely calling back callers to a voice messaging system according to claim 13, wherein:

said communication path includes said voice messaging system.

16. The method for remotely calling back callers to a voice messaging system according to claim 13, wherein:

said initiated call is to a previous caller who stored a voice message on said voice messaging system.

17. The method for remotely calling back callers to a voice messaging system according to claim 13, further comprising:

listening to said stored voice messages.

18. The method for remotely calling back callers to a voice messaging system according to claim 13, wherein:

said voice messaging system is a telephone answering device.

19. The method for remotely calling back callers to a voice messaging system according to claim 13, wherein:

said telephone answering device is a single telephone line device.

20. A method for remotely calling back callers to a voice messaging system, comprising:

allowing a remote user remote access via a single telephone line to stored voice messages in a voice messaging system;

placing said remote user on hold;

initiating, while said remote user remains on hold, a call on said, single telephone line from said voice messaging system;

establishing a communication path between said remote user and said call; and prompting said remote user for a telephone number of said call.

21. Apparatus for remotely calling back callers to a voice messaging system, comprising:

means for allowing a remote user remote access via a single telephone line to stored voice messages in a voice messaging system;

means for, placing said remote user on hold;

means for obtaining from a central office call related information regarding said call;

means for initiating, while said remote user remains on hold, a call on said single telephone line from said voice messaging system; and means for establishing a communication path between said remote user and said call.

22. The apparatus for remotely calling back callers to a voice messaging system according to claim 21, wherein:

said initiated call is to a previous caller who stored a voice message on said voice messaging system.

23. The apparatus for remotely calling back callers to a voice messaging system according to claim 21, wherein:

said apparatus is a single telephone line telephone answering device.

24. Apparatus for remotely calling back callers to a voice messaging system, comprising:

means for allowing a remote user remote access via a single telephone line to stored voice messages in a voice messaging system;

means for placing said remote user on hold;

means for initiating, while said remote user remains on hold, a call on said single telephone line from said voice messaging system;

means for establishing a communication path between said remote user and said call; and means for prompting said remote user for a telephone number of said call.

25. A telephone answering device comprising:

a controller;

a voice recorder and playback module;

a device to receive call related information through a central office; and a calling module activated by a remote user to place a call, said calling module causing said controller to signal a central office to place a remote user on a single telephone line on hold, allowing said voice messaging system to initiate a telephone call based on call related information received by said device through said central office, to a past caller over said single telephone line.

26. The telephone answering device according to claim 25, further comprising:

a first telephone line interface.

27. The telephone answering device according to claim 26, further comprising:

a second telephone line interface.

28. The telephone answering device according to claim 25, further comprising:

a DTMF generator controlled by said controller.

29. A telephone answering device, comprising:

a controller;

a voice recorder and playback module;

a call related information detector and receiver to obtain a telephone number of said caller; and a calling module activated by a remote user to place a call, said calling module causing said controller to signal a central office to place a remote user on a single telephone line on hold, allowing said voice messaging system to initiate a telephone call to a past caller over said single telephone line.

30. The telephone answering device according to claim 29, wherein:
said call related information detector and receiver is a Caller ID detector and receiver.

* * * * *